US011423439B2

(12) United States Patent
Brandstetter

(10) Patent No.: US 11,423,439 B2
(45) Date of Patent: Aug. 23, 2022

(54) EXPERT SEARCH THREAD INVITATION ENGINE

(71) Applicant: Jeffrey D. Brandstetter, San Francisco, CA (US)

(72) Inventor: Jeffrey D. Brandstetter, San Francisco, CA (US)

( * ) Notice: Subject to any disclaimer, the term of this patent is extended or adjusted under 35 U.S.C. 154(b) by 0 days.

(21) Appl. No.: 15/490,418

(22) Filed: Apr. 18, 2017

(65) Prior Publication Data

US 2018/0300393 A1 Oct. 18, 2018

(51) Int. Cl.
*G06Q 30/02* (2012.01)
*G06Q 50/00* (2012.01)

(52) U.S. Cl.
CPC ..... *G06Q 30/0251* (2013.01); *G06Q 30/0277* (2013.01); *G06Q 50/01* (2013.01)

(58) Field of Classification Search
CPC .............. G06Q 30/0251; G06Q 50/01; G06Q 30/0277; G06F 16/9535; G06F 16/24578
See application file for complete search history.

(56) References Cited

U.S. PATENT DOCUMENTS

| 9,336,268 B1* | 5/2016 | Moudy | G06F 16/24578 |
| 10,409,873 B2* | 9/2019 | Mashiach | G06F 16/9535 |
| 2008/0215541 A1* | 9/2008 | Li | G06F 16/951 |
| 2009/0119261 A1* | 5/2009 | Ismalon | G06F 16/355 |
| 2009/0150387 A1* | 6/2009 | Marchewitz | G06F 17/30864 |
| 2010/0119053 A1* | 5/2010 | Goeldi | G06Q 10/00 379/265.09 |
| 2011/0055207 A1* | 3/2011 | Schorzman | G06F 16/248 707/723 |
| 2012/0117059 A1* | 5/2012 | Bailey | G06F 16/9535 707/723 |
| 2012/0296974 A1* | 11/2012 | Tabe | G06Q 50/01 709/204 |
| 2014/0156681 A1* | 6/2014 | Lee | G06F 17/30867 707/754 |
| 2014/0280094 A1* | 9/2014 | Brandstetter | G06F 16/9535 707/723 |

(Continued)

FOREIGN PATENT DOCUMENTS

| CA | 2811164 A1 * | 3/2012 | ........... H01R 13/447 |
| CA | 2868948 A1 * | 4/2016 | ..... G06Q 10/063112 |
| WO | WO-2014201570 A1 * | 12/2014 | ............. G06F 40/20 |

OTHER PUBLICATIONS

Patent Cooperation Treaty; International Search Report and Written Opinion of the International Searching Authority; PCT/US2018/027873; dated May 21, 2018.

*Primary Examiner* — Cheyne D Ly
(74) *Attorney, Agent, or Firm* — Jones Day

(57) ABSTRACT

Systems and methods are provided for providing search results. Social media posts are analyzed to identify a candidate for authoring an expert search thread, where one or more search terms are extracted from one or more social media posts of the candidate. The candidate is contacted to solicit an expert search thread, where the expert search thread solicited includes an identification of a plurality of links entered via a user interface by the expert that the expert identifies as being helpful to learning about a topic associated with the one or more search terms. The expert search thread is included in a set of search results prompted by one or more of the search terms.

34 Claims, 11 Drawing Sheets

(56) References Cited

U.S. PATENT DOCUMENTS

| | | | |
|---|---|---|---|
| 2015/0026260 A1* | 1/2015 | Worthley | G06Q 10/10 709/204 |
| 2015/0100377 A1* | 4/2015 | Penumaka | G06Q 30/0201 705/7.29 |
| 2015/0100509 A1* | 4/2015 | Pappas | G06Q 30/02 707/723 |
| 2015/0227579 A1* | 8/2015 | Cantarero | G06F 16/313 707/708 |
| 2015/0254252 A1* | 9/2015 | Khalil | G06F 16/951 706/12 |
| 2015/0302478 A1* | 10/2015 | Michael | G06Q 50/01 705/14.55 |
| 2016/0080485 A1* | 3/2016 | Hamedi | H04L 67/02 709/204 |
| 2016/0117397 A1* | 4/2016 | Bansal | G06F 16/9535 707/723 |
| 2016/0171063 A1* | 6/2016 | Kiciman | G06Q 50/01 707/602 |
| 2016/0366080 A1* | 12/2016 | Bastide | H04L 51/12 |
| 2017/0011041 A1* | 1/2017 | Frieden | G06Q 10/063112 |
| 2017/0060873 A1* | 3/2017 | Rathod | G06Q 10/06 |
| 2017/0235836 A1* | 8/2017 | Wang | G06Q 50/01 707/730 |

\* cited by examiner

1. LIST MODE:

EXPERT 1's SEARCH THREAD:
   1ST LINK
   2ND LINK
   3RD LINK
   4TH LINK
   5TH LINK
   6TH LINK
   7TH LINK
   8TH LINK

EXPERT 2's SEARCH THREAD:
   1ST LINK
   2ND LINK
   3RD LINK
   4TH LINK
   5TH LINK
   6TH LINK

EXPERT 3's SEARCH THREAD:
   1ST LINK
   2ND LINK
   3RD LINK
   4TH LINK
   5TH LINK
   6TH LINK
   7TH LINK
   8TH LINK
   9TH LINK
   10TH LINK
   11TH LINK
   12TH LINK

*Fig. 4A*

2. GRAPHIC MODES:

A. BREADCRUMB FORMAT:

EXPERT 1's SEARCH THREAD:
   1ST LINK > 2ND LINK > 3RD LINK > 4TH LINK > 5TH LINK > 6TH LINK > 7TH LINK > 8TH LINK

EXPERT 2's SEARCH THREAD:
   1ST LINK > 2ND LINK > 3RD LINK > 4TH LINK > 5TH LINK

EXPERT 3's SEARCH THREAD:
   1ST LINK > 2ND LINK > 3RD LINK > 4TH LINK > 5TH LINK > 6TH LINK > 7TH LINK

*Fig. 4B*

B. FLOWCHART FORMAT:
EXPERT 1's SEARCH THREAD:
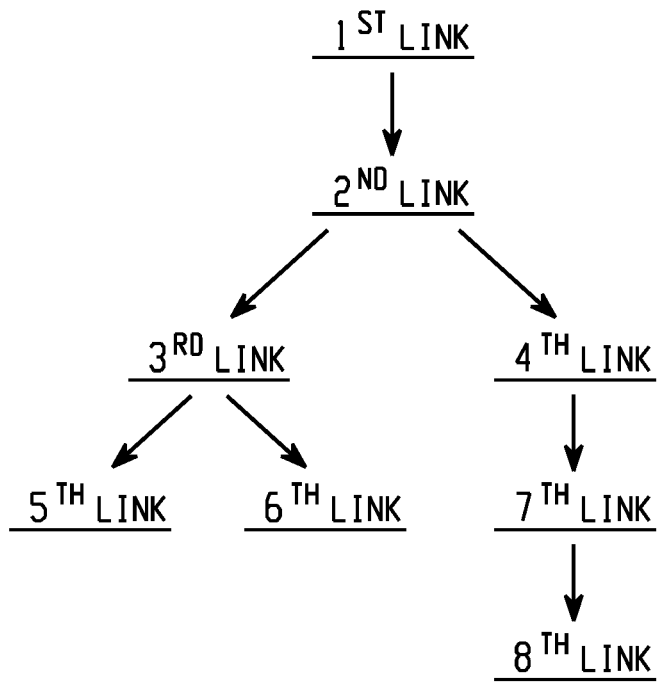
EXPERT 2's SEARCH THREAD:
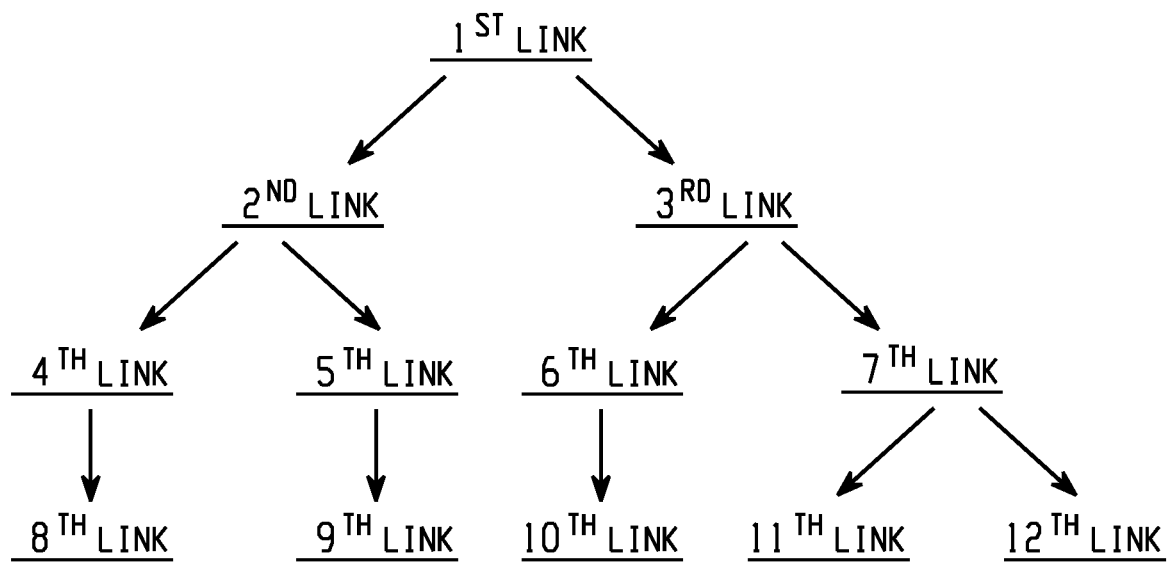
Fig. 4C You   Search   Images   Maps   Play   YouTube   News   Gmail   Drive   Calendar   More ▽

| "copyright law" "scenes a|faire" | □ | Sign in |

Web   Images   Maps   Shopping   More ▽   Search Tools

About 41,200 results (0.21 seconds)

Scenes a faire - Wikipedia, the free encyclopedia
en.wikipedia.org/wiki/Scenes_a_faire
In the U.S. it also refers to a principle in copyright law in which certain elements of a
creative work are held to be not...Scenes a Faire Under Copyright Law.

Scenes A Faire Under Copyright Law
www.ivanhoffman.com/scenes.html
The loose definition of scenes a faire refers to situations in which there is essentially
no other way to express a particular idea except by using ceratin elements....

[PDF] Software and scenes a faire - Jones Day
www.jonesday.com/files/.../011-013-Cw-May09-Feat.pdf
File Format: PDF/Adobe Acrobat
Introduced into copyright law more than 75 years ago in a decision involving scenes
from a movie titled When Tomorrow Comes.1 At its most general, the....

Scenes A Faire Definition
www.duhaime.org>Legal Dictionary
Scenes a faire, sequences of events which necessarily follow from a common...
Duhaime, Lloyd, Copyright Law: Duhaime, Lloyd, Intellectual and Internet Law...

Copyright, Originality, and the End of the Scenes a Faire and Merger...
https://litigation-essentials.lexisnexis.com/.../app?...
by MD Murray - 2006 - Cited by 17 - Related articles
Part II will describe the merger doctrine and scenes a faire doctrine that fall under the
requirement of originality in the United States copyright law and explain the...

MATCH TO FIG.5B

Fig. 5A

MATCH TO FIG. 5A

[PDF] Wake Forest - Journal of Business & Intellectual Property Law
ipjournal.law.wfu.edu/files/2009/09/article.8.128.pdf
File Format: PDF/Adobe Acrobat - Quick View
by TAQP Quo - Cited by 3 - Related Articles
Scenes A Faire as the Second Tool of...Burden of Proof in Cases of Merger and
Scenes a Faire...One of the least clearly defined concepts in copyright law is...

Scenes a Faire Law & Legal Definition
definitions.uslegal.com>Legal Definitions Home S
The phrase is commonly used in copyright law...except by using certain elements and
in such instances, those elements will often be termed "scenes a faire."...

Doctrine of Merger or "scenes a faire" doctrine under Copyri | Free...
www.freelegaladvisors.com/blogs/?p-624
Nov. 29, 2012 - Doctrine of Merger or "scenes a faire" doctrine under Copyright Law. It
is the cardinal principle of copyright law that the idea is not copyrightable....

Scenes a faire : Seattle Copyright Watch : Washington Intellectual...
www.seattlecopyrightwatch.com/copyright/scenes-a-faire/
Jun 9, 2011 - Plaintiff's drawings are scenes a faire (a standard feature). Scope of
protection...Useful articles are not protected by copyright law. Substantial....

Concurring Opinions >> What's a Scenes a Faire?
www.concurringopinions.com/archives/.../whats-a-scenes-a-faire.html...
Mar 1, 2013 - Traditional copyright law is full of doctrines that appear to make sense
from a distance but...They are what the French call "scenes a faire".

Ads related to "copyright law" "scenes a faire"

Register a Trademark $149
www.thetrademarkcompany.com/
Register a Trademark in 5 Minutes! Have Questions? Call 800-906-8626.
Free to Get Started (800) 906-8626 - Customer Testimonials Copyright in 3 Easy Steps
www.legalzoom.com/Copyright

Fig. 5B

EXPERT SEARCH THREAD INVITATION ENGINE

TECHNICAL FIELD

This document relates generally to expert search threads and more particularly to identifying experts to prepare expert search threads.

BACKGROUND

In an effort to increase the relevancy of search results, current search algorithms compile vast amounts of data regarding which websites receive the most user traffic in response to various search terms and keywords input by users in connection with search queries, including closely-related search terms and keywords and combinations thereof, and then rank and display the results of those data compilations, often in descending order from the most visited websites in connection with such search terms and keywords to the least visited websites. But just because it can be counted doesn't mean it counts. As anyone who has performed even the most cursory search knows all too well, this approach often yields literally thousands of irrelevant search results in response to a search query, with no guidance offered whatsoever as to how best to "drill down" into a particular subject or topic, the optimal order in which to view each search result, etc.

Expert search threads, as described in further detail herein, provide a mechanism for a person knowledgeable in a field to provide a resource for others to learn about a topic in that field. In exchange for producing an expert search thread, the creator of the expert search thread is provided increased notoriety via attribution that is included when the creator's expert search thread is displayed. Systems and methods as described herein facilitate identification of persons knowledgeable in a field for contact to produce an expert search thread on a topic within the field.

SUMMARY

Systems and methods are provided for providing search results. Social media posts are analyzed to identify a candidate for authoring an expert search thread, where one or more search terms are extracted from one or more social media posts of the candidate. The candidate is contacted to solicit an expert search thread, where the expert search thread solicited includes an identification of a plurality of links entered via a user interface by the expert that the expert identifies as being helpful to learning about a topic associated with the one or more search terms. The expert search thread is included in a set of search results prompted by one or more of the search terms.

As another example, a system for providing search results includes one or more data processors and one or more computer-readable memories encoded with instructions for commanding the one or more data processors to execute steps. In the steps, social media posts are analyzed to identify a candidate for authoring an expert search thread, where one or more search terms are extracted from one or more social media posts of the candidate. The candidate is contacted to solicit an expert search thread, where the expert search thread solicited includes an identification of a plurality of links entered via a user interface by the expert that the expert identifies as being helpful to learning about a topic associated with the one or more search terms. The expert search thread is included in a set of search results prompted by one or more of the search terms.

As a further example, a computer-readable medium encoded with instructions for commanding one or more data processors to execute steps of a method for providing search results. In the method, social media posts are analyzed to identify a candidate for authoring an expert search thread, where one or more search terms are extracted from one or more social media posts of the candidate. The candidate is contacted to solicit an expert search thread, where the expert search thread solicited includes an identification of a plurality of links entered via a user interface by the expert that the expert identifies as being helpful to learning about a topic associated with the one or more search terms. The expert search thread is included in a set of search results prompted by one or more of the search terms.

BRIEF DESCRIPTION OF THE DRAWINGS

FIGS. 4A-4D depict example organizations of search results.

FIG. 5 depicts an example display of search results.

DETAILED DESCRIPTION

The key to improving search is navigation, something best done by an expert or at least someone with considerably more familiarity about a given topic or subject matter than most other users. As noted above, current state of the art search focuses on a "wisdom of the masses" approach by creating algorithms that rank search results according to those sites most frequently visited in connection with various search terms and keywords, related search terms and keywords, and combinations thereof. By contrast, a navigation-based approach to search, as described herein, focuses on the "wisdom of the experts" by tracking the search threads of designated "experts" (i.e., individuals with considerably more familiarity about a given topic or subject matter than most other users), and displaying those search threads as part of the search results returned to other users whenever the same or related search terms or keywords are used by other users in connection with their particular search(es). These experts, who essentially perform a curator function by helping to guide others less knowledgeable about a particular topic or subject matter through the maze of search results returned in any search, are designated as experts using algorithms similar to those currently employed in returning the search results themselves (i.e., through a crowdsourcing/wisdom of the crowd approach, whereby those experts whose search threads are most often followed by other users rank higher in terms of their "expertise" about a given topic or subject matter than those who are less popular among other users). The search threads of these experts are then displayed (e.g., in descending order from the highest ranking to the lowest) together with search term/keyword search results, thereby augmenting the search results displayed in response to a user's search query by offering expert navigation of the particular topic or subject matter searched by such user.

Providing a means of both capturing and displaying for other users the search threads of experts will result in a superior (or at least decidedly improved) system and method of search by adding elements beyond mere data compilation. Augmenting search results with the search threads of experts and other knowledgeable individuals (as determined through a crowdsourcing/wisdom of the crowd approach) will result in improved search because it is search guided or navigated by experts, as opposed to the proverbial "blind leading the blind" system/method currently employed whereby organic search results (apart from paid or sponsored search results, which are given the highest ranking on some websites in exchange for payment by the company or other search result so listed) are given the highest ranking based on algorithms that calculate which websites have received the greatest amount of web traffic using the same or similar search terms as the one(s) being used by the searcher-user.

Figure 1:
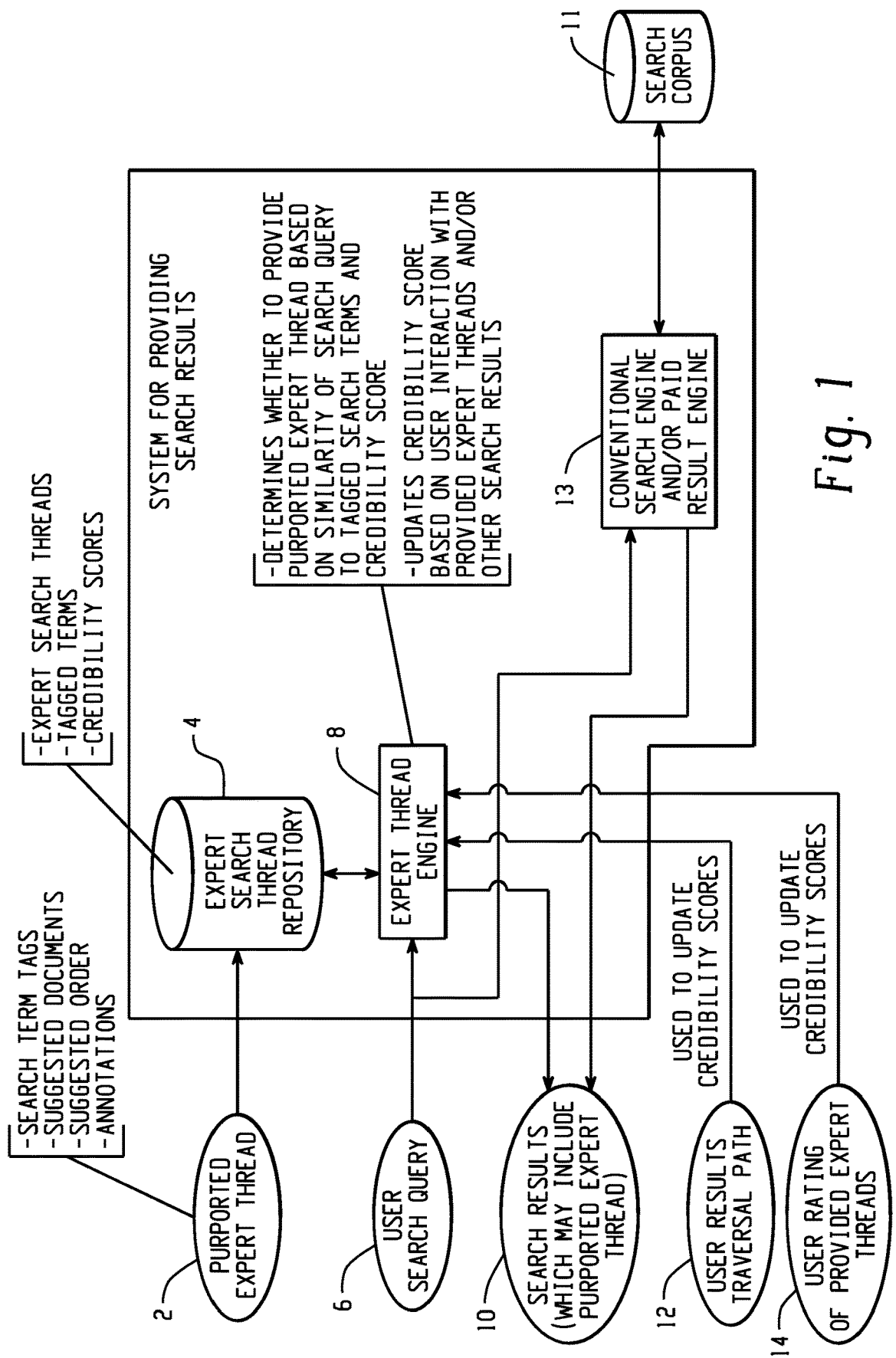
FIG. 1 is a block diagram depicting an example system for providing search results.

FIG. 1 is a block diagram depicting an example system for providing search results. In a system or method of providing a search solution, an expert inputs a suggested thread 2 of materials that he thinks will best inform a reader as to a particular topic. The expert's suggested thread 2 may also include an order in which the expert thinks that the identified materials should be reviewed for optimal understanding. An expert annotation engine may further allow the expert to notate, highlight, crop or create clips of search results (e.g., of search results containing image, audio or video files) within a suggested expert thread, and to provide comments, suggestions, guidelines, and the like for navigating the expert thread or any search result within the expert thread.

In one example, upon identifying himself as a purported expert that will be providing a suggested thread 2 for review of a topic, the expert performs a search utilizing one or more search terms. The search terms used for the expert's search are noted by the system as tags for the expert's thread, where when a later user performs searches utilizing those tagged terms, the expert's thread may be suggested to the subsequent user. Upon receiving search results, the expert marks or otherwise identifies all or a portion of the results as being relevant to the topic at hand. The expert may further organize the search results into one or more suggested orders for review. The expert may order the marked search results based on a variety of criteria, such as macro to micro, deductive, inductive, chronological in terms of which site a user should look at first, second, third, etc. The expert search thread 2 is provided to an expert search thread repository 4 for storage.

After submitting a suggested search thread 2 associated with a set of search terms, a determination is made as to the quality of the submitted search thread through observation of subsequent users' interactions with search results for the same or similar set of search terms. The more often that subsequent users use the expert's suggested thread 2 or follow a path similar to the expert's thread 2, the higher the level of credibility is given to that expert thread. For example, in one embodiment, a subsequent user performs a search 6 using search terms that are very similar to the tagged terms associated with the expert's thread 2. An expert thread engine 8 deems the subsequent user's search terms 6 to have a similarity score of 0.9 on a scale of 0-1. If the user is provided the expert's thread 2 along with other results 10 extracted from a search corpus 11 by a conventional search engine or paid result engine 13 and follows the thread exactly, as detected at 12, then the expert credibility level for that search is at its highest possible level (e.g., 1.0 on a scale of 0-1.) If the subsequent user instead opts to traverse a path of returned results on his own 12, the credibility score for the expert's thread will be somewhat less than 1 (unless the subsequent user independently follows the exact thread path suggested by the expert). If the subsequent user follows a results review path 12 similar to the expert's suggested path, then the credibility for the expert thread may be in the 0.75 range, while if a significantly different path 12 is executed by the subsequent user (e.g., different materials reviewed in a different order), then the credibility score may be quite low for that search (e.g., 0.2). Based on the similarity of the subsequent user search terms to the tagged terms for the expert's thread and the credibility score for the expert's thread determined via the subsequent user's browsing path 12, a credibility value is determined for the expert's thread for that search. A composite credibility value for the expert's thread is maintained, such as in the expert search thread repository 4, based on a collection of data for all subsequent users' searches using query terms similar to the terms associated with the expert's thread.

That composite credibility value associated with an expert's thread 2 is used to determine whether that expert's thread 2 should be suggested to subsequent users, and when that expert's thread is to be suggested, the positioning of that expert's thread 2 among other experts' suggestions. A system of providing a search solution may seek to provide the best expert thread as the top expert thread result for a subsequent user who has performed a query using terms similar to those associated with suggested expert threads. If a particular expert thread has been reliably followed by many other users who have performed searches using similar terms, it is likely that that particular expert thread is credible and will be helpful to the current searching user.

In one example, a computer system providing search results receives a search query containing one or more search terms or keywords. A determination is made as to the similarity of the search terms and tagged terms associated with one or more expert threads. Based on similarity scores between the search terms and the tagged terms for expert threads and composite credibility scores of the expert threads, a determination of which expert threads should be provided to the searching user and an order for those expert threads. For example, the expert threads may be ranked based on a product of the similarity score of the expert thread to the current search terms and the composite credibility score for that expert thread. A top n expert threads are then provided as suggested expert threads for the user to traverse.

In addition to providing the new user with suggested expert threads to traverse, the system may monitor the actual path of user browsing to further update the composite credibility scores for the expert threads. This continual updating of the credibility scores may further strengthen expert thread suggestions. For example, if an expert thread becomes outdated, as fewer and fewer subsequent users follow that expert thread, that expert thread will be recommended less and less or not at all.

In addition to adjusting credibility scores based on search result traversal paths of subsequent users, credibility scores for expert threads could be based on a variety of other factors. For example, a credibility score may be adjusted based on a user ranking or other user feedback of suggested expert threads 14. For example, when a user finds an expert thread to be helpful, the user may 'like' or provide a 'thumbs up' to that expert thread, while unhelpful suggested expert threads could be down-voted or otherwise provided a low score. Such recommendations or poor reviews could be incorporated into the composite credibility score for the rated expert threads. The adjustment to the credibility score could further be augmented based on an identified expertise level of the rating user (e.g., a fellow expert's high rating of a thread could be valued highly, a novice user who found an expert thread particularly helpful could be highly valued).

Experts can be provided incentives to expend the effort to generate expert search threads through presentation of their expert search threads on a results page. For example, certain biographical information associated with an expert who designs an expert search thread can be included with a listing of the expert search thread on a results page. Information such as the expert's name, contact information, biographical information, or a link to a webpage associated with the expert or a business associated with the expert can be included with the expert's search thread. In this way, the expert can generate notoriety and publicity through the generation of expert search threads, where users who are provided highly rated expert search threads are likely to further investigate the experts who generated those threads, generating interest in the expert and traffic to the expert's web pages.

In addition to providing benefits to experts who generate expert search threads, a search engine that provides expert search threads can generate revenue through providing such threads for users to traverse. For example, advertising can be displayed on user interfaces that provide expert search threads for users to traverse. Advertisers who wish to have their advertisements displayed pay for such advertisements in a variety of ways, such as on a cost per action basis (e.g., cost per 1000 impressions, CPM, cost per click through). A search engine provider can charge different "cost per" rates for different user interface displays. For example, a search engine provider may charge a rate (e.g., $0.60 per 1000 impressions) for a first display that lists all of the expert search threads associated with a user search. The display that lists all expert search threads may be considered valuable because it will be provided to all users who enter the search terms.

In one example, when a user clicks a link to one of the listed expert search threads, that user is directed to a second level display that lists details of the expert search thread that they have selected. Advertising may also be provided on the second level display, where advertisers are charged a rate for displaying advertisements on the second level display according to the rank of the expert search thread in the set of expert search threads provided to the user, a credibility score associated with the expert search thread, or other metric associated with the quality of the expert search thread. Thus, a first listed expert search thread may have advertising on its second level display that is provided for an advertiser at first rate (e.g., $0.60 per 1000 impressions), while advertising on expert search threads listed lower on the results is charged a lower rate (e.g., $0.20 per 1000 impressions for the tenth ranked expert search report). In this manner, the search engine provider can discriminate the costs charged to advertisers according to a value associated with the user interfaces being provided to the user.

Figure 2:
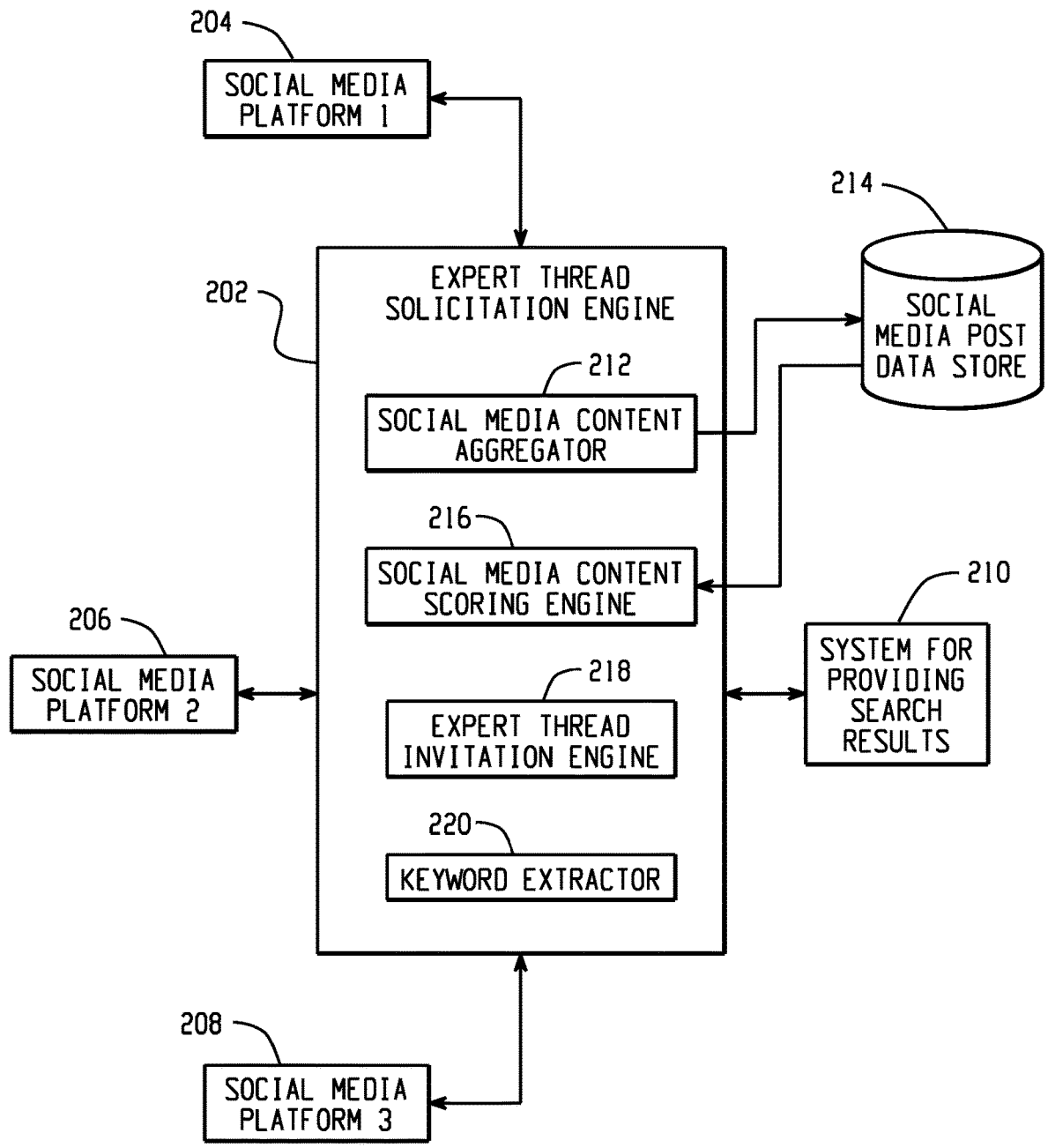
FIG. 2 is a block diagram depicting an expert thread solicitation engine that is configured to direct candidate authors to a system for providing search results to author expert search threads.

Systems and methods as described herein can include functionality for identifying candidate authors for expert search threads and mechanisms for contacting those identified candidate authors. FIG. 2 is a block diagram depicting an expert thread solicitation engine that is configured to direct candidate authors to a system for providing search results to author expert search threads. As noted above, expert search threads provide a mechanism for a person knowledgeable in a field to create a resource for others to learn about a topic in that field. In exchange for producing an expert search thread, the creator of the expert search thread is provided increased notoriety via attribution that is included when the creator's expert search thread is displayed. Thus, there is a benefit to both the studier of an expert search thread as well as the creator. Systems and methods described herein are configured to identify candidate authors and bring expert search thread creation engines to their attention so that both studiers and creators can enjoy the mutual benefits.

The system of FIG. 2 identifies candidates for creating expert search threads through the analysis of social media posts. Social media has become pervasive in today's society, where persons commonly present their viewpoints on a wide variety of topics for their friends or the public at large to see. Whether the topic is related to current events, pop culture, politics, science, or otherwise, social media posts are constantly being made by the millions. Certain of these posts are being published by knowledgeable persons with the intent to teach others or to skillfully persuade people through well-crafted arguments. Those knowledgeable persons are strong candidates for authoring expert search threads, as described herein. These expert search threads further expand the reach of their teaching/persuasive efforts while simultaneously increasing their stature through attribution on their expert search threads. Such attribution can drive internet traffic to the destination of their choosing, including back to their social media accounts—creating a feedback loop for raising notoriety.

The system of FIG. 2 includes an expert thread solicitation engine 202 that communicates with a number of social media platforms 204, 206, 208 (e.g., Facebook, Twitter, MySpace, YouTube, Instagram, Google+, Qzone, Sina Weibo, Habbo, VK, Tumblr, LinkedIn), as well as a system for providing search results 210 (e.g., the system described above with reference to FIG. 1). The expert thread solicitation engine 202 is configured to aggregate posts made by persons on those social media platforms 204, 206, 208 and to analyze those posts to identify candidates who are likely to author high quality expert search threads. The engine then solicits those candidates to author expert search threads.

In the example of FIG. 2, the expert thread solicitation engine 202 includes a social media content aggregator 212 that is configured to acquire postings made to the social media platforms 204, 206, 208 and to store those postings in a database 214. The aggregator, in one implementation, is configured to automatically traverse the social media platforms 204, 206, 208 to acquire public posts (and private posts of persons who consent to access by the expert thread solicitation engine) made to those platforms. The database 214 entries include an indication of the author of those posts, which enables contacting those authors when their posts are deemed to be of sufficient quality. In one example, social media accounts of single persons are linked together across social media platforms 204, 206, 208, as such intelligence is gathered, enabling evaluation of a particular person for possible contacting as a candidate across a broader spectrum of that particular person's social media posting history.

The expert thread solicitation engine 202 further includes a social media content scoring engine 214 that evaluates the social media posts acquired by the content aggregator 212 and stored in the database 214. The scoring engine can be configured to score social media posts based on a wide variety of criteria. In one example, the scoring engine 216 is configured to consider social media posts on their own, such that one particularly insightful post can result in the author of that post being contacted as a candidate for authoring expert search threads. In another example, the scoring engine 216 considers multiple posts by a particular person on a single social media platform 204, 206, 208 in considering whether that person should be considered a candidate. In a further example, multiple social media posts across multiple platforms 204, 206, 208 are analyzed and scored to identify candidates. Example criteria for evaluating social media posts are described in further detail with reference to FIG. 3.

When a person is identified as a candidate to author an expert search thread (e.g., based on one or more scores by the scoring engine 216 surpassing a threshold level), an expert thread invitation engine 218 is configured to content that candidate. That contacting can be performed in a variety of ways. In one embodiment, the invitation engine 218 is configured to automatically generate a post on the social media platform 204, 206, 208 where the candidate made the one or more high quality posts that resulted in candidate identification. For example, the invitation engine 218 may add a reply to a high quality post of the candidate that includes a congratulations and a link to the engine for authoring expert search threads 210. This invitation mechanism not only entices the candidate to author an expert search thread, it also further publicizes the expert search thread platform via a post on what is likely a popular social media thread. In other implementations, the invitation may be more private, such as via a private message on the social media platform 204, 206, 208 where the quality post was made or via an email from the engine for authoring expert search threads 210.

The invitation may prompt the candidate to author an expert search thread on a topic associated with their social media post that was scored. The invitation might also prompt the candidate to author expert search threads on any topic. In one embodiment, when the scoring engine 216 identifies a candidate of a particularly high caliber (e.g., a candidate whose score surpasses a second, higher threshold than a first threshold to be identified as a candidate for authoring expert search threads on a particular topic), that candidate is considered a super-candidate and is invited to author expert search threads on more topics or any topic.

In one embodiment, the expert thread solicitation engine 202 is configured to facilitate streamlined creation of an expert search thread by a contacted candidate. For example, the expert thread solicitation engine 202 can include a keyword extractor 220 that identifies important keywords in social media content that receives high scores at 216. Those identified keywords from the candidate's post(s) (e.g., nouns, verbs, words that do not commonly appear in social media posts based on an evaluation of a large corpus of social media posts) can be associated with an invitation to a candidate, such that when the candidate accesses an engine for authoring an expert search thread via the invitation, those keywords can be pre-populated as keywords for the expert search thread, where the candidate may be permitted to augment and add to those keywords in authoring their expert search thread as they deem appropriate.

The expert thread solicitation engine 202 can further be configured to implement key word discipline regarding additional keywords entered by the candidate in order to prevent "gaming of the system." For example, a candidate could, in designing an expert search thread, attempt to associate off topic additional search terms (e.g., additional search terms that are associated with a currently trending topic that is not related to the topic of the candidate's expert search thread) in an attempt to drive traffic to that expert search thread. The expert thread solicitation engine 202 can be configured to monitor the additional keywords entered by the candidate and to refuse to associate off topic words with the expert search thread.

Enforcing keyword discipline can be performed in a variety of ways. In one example, the additional keywords are compared to words used in the pages linked to by the expert search thread. In such an example, words at those destination pages can be extracted and compared to the additional keywords to determine whether the additional keywords are off topic. This can be done via one or more distance calculations, where a distance is calculated between one of the additional search terms and the extracted words, where the additional search term is deemed off topic when the distance is greater than a threshold.

Distances between words can be calculated in a variety of ways. In one implementation, a distance between an additional keyword and an extracted word is calculated via a hierarchical clustering operation. There, a taxonomy data store is used, which includes a hierarchy of word clusters based on meanings of words in the clusters. In that hierarchy, clusters of words (e.g., WordNet synsets) having similar or related meanings appear close to one another in the hierarchy. In that example, a first cluster associated with the additional search term is identified, and a second cluster associated with the extracted word is identified. A distance between those clusters in the hierarchy is then calculated (e.g., the number of nodes in the hierarchy that must be traversed to get from the first cluster to the second cluster).

A candidate word can be deemed off topic when a distance associated with the additional search term (e.g., an average distance between the additional search term and each of the extracted words, a smallest distance between the additional search term and each of the extracted words) is greater than a threshold. A warning can be provided to the candidate to inform the candidate that one of his additional search terms is deemed off topic. Or the additional search term can simply be excluded from the list of additional search terms associated with the expert search thread. While keyword discipline is discussed relative to expert search threads in this example, such keyword discipline can be implemented to police search engine gaming (e.g., improper search engine optimization) by any search engine (e.g., a general web page search engine, a video search engine).

Figure 3:
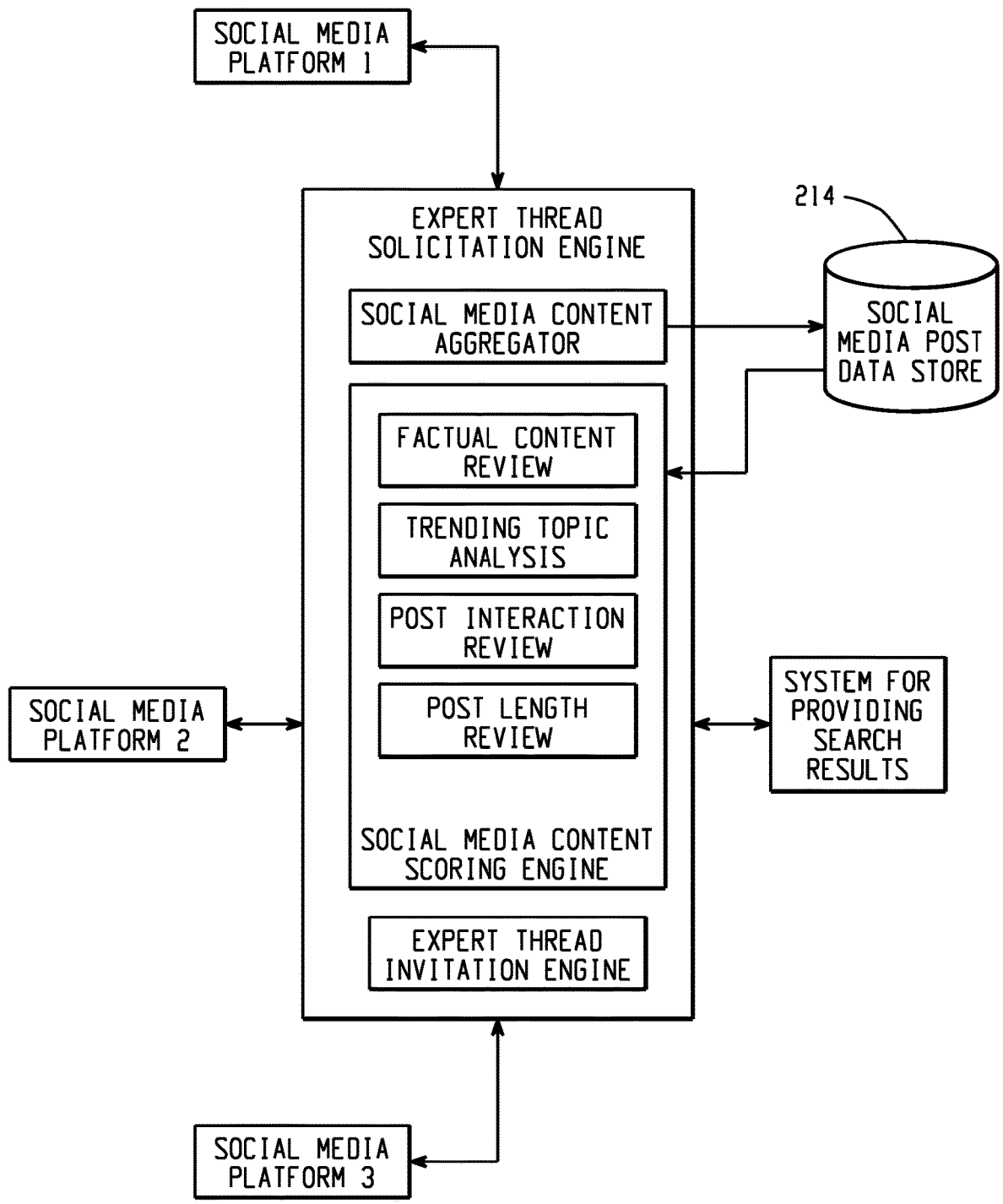
FIG. 3 is a block diagram depicting example criteria for scoring social media content for identifying expert search thread author candidates.

FIG. 3 is a block diagram depicting example criteria for scoring social media content for identifying expert search thread author candidates. Captured social media posts can be evaluated based on a number of criteria, alone or in combination, to determine whether an author of social media posts should be identified as a candidate for authoring an expert search thread. For example, characteristics of social media posts can be extracted and then used as inputs to a regression (e.g., linear) model that uses weights that are based on correlations between post characteristics and high quality posts. Example characteristics include the length of a post (where longer posts may be indications of higher quality content) and the number of interactions (e.g., views, shares, likes, replies) associated with a post (where more interactions may be an indication of higher quality content). Web pages (e.g., social media profile pages) of the candidate can also be reviewed to determine whether the candidate has published works (e.g., books, journal articles, blog posts) on the topic of their post, where topical published authors' posts are identified as having increased quality.

In one example, a social media post may be evaluated based on its factual content. Factual content review can take a variety of forms and levels of sophistication. In one example, a number of factual statements in a post can be determined based on an evaluation of sentence structure in a post, where part-of-speech patterns in a sentence can be used to indicate statements in the post that are likely factual in nature. In other embodiments, factual statements made in a post can be evaluated for truth/accuracy, such as based on a comparison of a particular factual statement to a fact repository (e.g., Wikipedia, Snopes) or a repository of false facts (e.g., a repository of recent false facts commonly posted to social media) to identify a number of accurate factual statements in a post. Posts having higher numbers of factual statements or accurate factual statements can be scored higher by a scoring engine.

In an embodiment, the scoring engine can also score a social media post based on a trending topic analysis. In one instance, social media posts that are associated with topics that are more broadly trending on social media (e.g., based on trending topic search terms, based on words (in some instances having certain words such as articles and conjunctions filtered out) appearing with frequency in recent (e.g., in the last week, in the last 24 hours) circulated publications (e.g., newspaper articles, magazines, online articles, blogs)) can be given a higher score based on those posts being topical. In another implementation, social media posts made in the past about topics that are currently trending can be given especially high scores because those posts were made before the topic was popular, indicating prescience of the poster, and because those posts were made during a time period when less emotion was likely associated with the topic, indicating that the poster was not posting to inflame or to attract cheap attention. In such an implementation, a score for the post may be based on a current trending intensity and an amount of time prior to that topic trending
(e.g., TrendScore=TrendIntensity * Constant * NumberOfDaysPostWasMadeBeforeTrend). In another example, the score for the post may be based on a current trending intensity and a trending intensity at the time the post was made
(e.g., TrendScore=CurrentTrendIntensity/TrendIntensityAtTimeOfPosting).

Social media content scores can be stored in a database and used for identifying candidates for authoring expert search threads. A candidate may be selected based on a single score that exceeds a threshold or based on an aggregation of multiple scores associated with their social media postings.

A. Search Results Interface.

A results page may include a set of hyperlinks listed in much the same way current search results are presented (i.e., hyperlinks to each expert's thread associated with the search terms or keywords input by a user, with the URL and introductory/overview text about the topic or subject matter covered presented below each hyperlink).

Additionally, a set of expert search thread (e.g., ThreadSearch™) search results might appear as follows: After a user inputs search terms and keywords into a search bar, one set of results appearing on the search results page will list organic/natural search results (i.e., those whose placement is uninfluenced by money or any other factor other than relevance) in the form of hyperlinks (e.g., organized in descending order from the most visited websites to the least visited websites) associated with those search terms and keywords. Another set of results appearing on the search results page will list paid search hyperlinks or ads (i.e., where the highest or otherwise highlighted positions are given to those who have paid a premium price for higher placement than organic/natural search results) associated with those search terms and keywords. Still another set of results appearing on the search results page will list expert search thread hyperlinks associated with those same search terms and keywords.

The actual placement of these expert search thread hyperlinks can vary—they can appear alongside or above organic/natural and paid search results, or below paid search results but above organic/natural search results, or as a daughter window, pop-up window or the like associated with either/both the organic/natural search results and the paid search results. There could also be prompts offered by the search engine alerting the user to the existence of expert search thread hyperlinks related to the particular search being performed, or a button or other means of turning on/off the expert search thread feature such that when this setting is turned on/activated by a user, the expert search thread hyperlinks appear together with organic/natural and paid search results). In one example, the expert search threads are provided as a separate category of search results from the two dominant categories in existence today (i.e., organic/natural search results and paid search results).

Figure 4D:
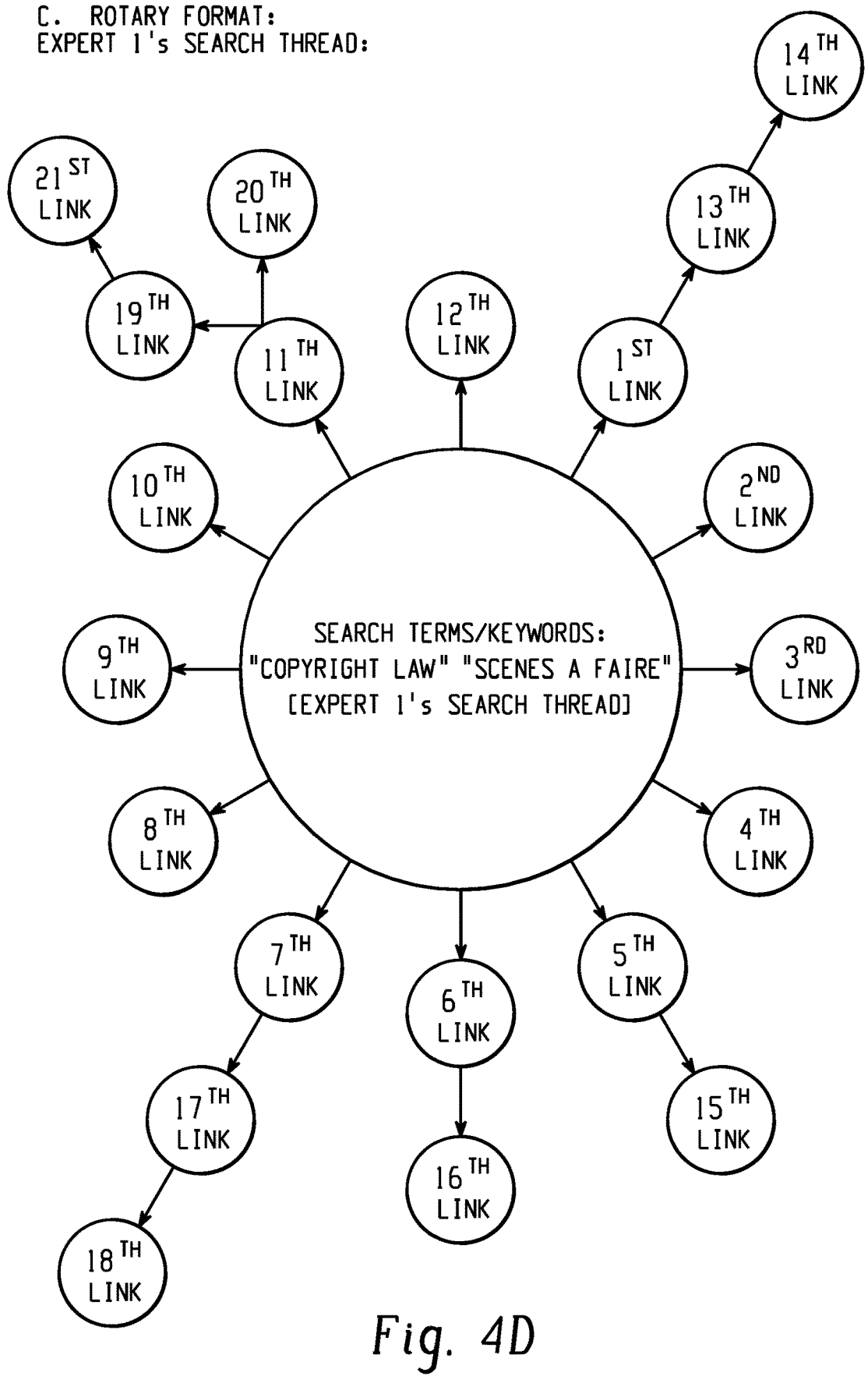

For example, currently, if a user inputs the search terms "copyright law" and "scenes a faire" into a search bar, the search results currently presented show a list of hyperlinks associated with those search terms/keywords (i.e., the organic/natural search results), with a link to the Wikipedia entry for "Scènes à faire" appearing first (i.e., at the top of the list), followed by an article entitled "SCENES A FAIRE UNDER COPYRIGHT LAW" authored by an attorney, followed by a link to a PDF of an article entitled "Software and scenes a faire" written by Jones Day attorneys, and so on. At the bottom of the first page of these search results is a single ad related to the search terms/keywords entitled "Copyright Registration," which is highlighted both by its placement at the bottom below the organic/natural search results and by a colored background that sets it apart from the rest of the display page, which has a white background. The expert search thread search results could appear alongside the organic/natural and paid search results currently displayed or be otherwise highlighted/set apart from those search results (e.g., by placing them to the right of the search results currently displayed and with a different colored background), and displayed/presented as hyperlinks to each expert's thread (e.g., in descending order of popularity in terms of how often an expert's thread is accessed in connection with the search terms/keywords being searched). Once a user clicks on the link to a particular expert's thread, that thread might appear in (1) a list mode (e.g., listing from top to bottom each link in that expert's thread in the order that expert recommends viewing each such link), or (2) a graphic mode—where an icon, number or other placeholder for each link in that expert's search thread is presented horizontally, vertically, or otherwise spatially (e.g., using concentric circles, a Venn diagram, a "breadcrumbs" format, a timeline format, a flowchart or other hierarchical format, a clock-like format, or other visual format that shows the order in which a user might drill down into a particular topic or subject matter, similar to "breadcrumbs" or navigational guideposts such as arrows or some other indicator of the vector/direction of the expert's recommended navigation/drill-down through his recommended/curated search results). Several example organizations of search results are included herewith as FIG. 4.

B. Example Use Case.

Currently, a Google search using the search terms "copyright law" and "scenes a faire" yields a set of initial results, in order of their appearance on the results page, as shown in FIG. 5.

Those Initial Results Include:
- A Wikipedia entry for "scenes a faire," which provides a two-sentence description of the doctrine, followed by two examples and three cases in which the doctrine was asserted as an affirmative defense.
- A brief article written by an attorney, which focuses entirely on the Ninth Circuit Court of Appeals decision in *Ets-Hokin v. Skyy Spirits, Inc., et. al.* (without even a case citation to that case).
- An article written by Jones Day attorneys back in May 2009 proposing how the scenes a faire doctrine might be applied to computer software cases.
- A legal dictionary definition provided by an obscure online dictionary called Durhaime.org based in Canada (which appears to be a marketing tool for that firm), which contains a one-sentence (and woefully incomplete) definition of the scenes a faire doctrine.
- A 2006 article available through LexisNexis entitled "Copyright, Originality, and the End of the Scenes a Faire and Merger Doctrines for Visual Works" (which can only be accessed by paying a fee of $15+tax).

At the bottom of the initial search results page, there are two paid search ads, the first of which is an ad offering trademark registration for $149, and the second being an ad by LegalZoom.com offering copyright registration services. Neither of these paid search results appears to have anything to do with the scenes a faire doctrine.

Using the expert search thread feature, by contrast, in addition to the above-described organic search results (plus any paid search results), a search results page might yield the following initial results—i.e., links to the search threads of the top ranking experts:
- [Expert 1's search thread link]
  - Jeffrey D. Brandstetter—Entertainment & Intellectual Property Attorney, Law Offices of Jeffrey Brandstetter, San Francisco, Calif.
- [Expert 2's search thread link]
  - Matthew W. Johnson—Registered Patent Attorney/Senior Associate, Jones Day, Pittsburgh, Pa.
- [Expert 3's search thread link]
  - David Nimmer—Copyright law expert and law professor; Of Counsel at Irell & Manella, LLP, Los Angeles, Calif.; has updated/revised *Nimmer on Copyright* since 1985
- [Expert 4's search thread link]
  - Paul Goldstein—Copyright law expert and law professor at Stanford University; Of Counsel at Morrison & Foerster; author of *Goldstein on Copyright*
- [Expert 5's search thread link]
  - William F. Patry—Copyright law expert and Senior Copyright Counsel at Google; former Professor of Law at Benjamin N. Cardozo School of law; author of *Patry on Copyright*

When, for example, a user clicks on Expert 1's search thread link, the following search thread might be displayed (which could well include additional entries beyond the initial five included below):
1. Scenes a Faire
   http://www.answers.com/topic/scenes-faire
   scène à faire [sen a fair], a French term for the kind of scene within a drama towards which the preceding action seems inevitably to tend, such as the crucial encounter between hero and villain.
   [NOTE: Although this entry merely copies/pastes entries from other sources (e.g., Oxford Dictionary, Wikipedia, etc.), it provides a good brief introduction to the scene a faire doctrine by presenting those multiple entries on a single "snapshot" page.]
2. What's a Scenes a Faire?
   http://www.concurringopinions.com/archives/2013/03/whats-a-scenes-a-faire.html
   The scenes a faire doctrine is an exception to copyright protection. It emerged in the 1940s, not coincidentally only a few years after the merger of law and equity in federal courts after the 1938 adoption of the Federal Rules of Civil Procedure. The term itself was first used in an opinion by . . .
   [NOTE: The partial sentence copied above (which is highly relevant to the topic being searched) is a snippet cropped by the expert of this thread from the fourth paragraph appearing at this URL, as opposed to the first partial sentence of every URL typically listed on the search results page following an organic search (e.g., performed on Google), which may or may not be relevant to the topic searched]
3. Copyright, Originality, and the End of the Scenes a Faire and Merger Doctrines for Visual Works
   http://papers.ssrn.com/sol3/papers.cfm?abstract id=900148
   The scenes a faire doctrine complements the merger doctrine by providing that certain subject matter—stock images, tried and true story lines, fables and folklore, scenes of nature, common visual and cultural references, all of which fall under the description of scenes that must be done—are not copyrightable because they are part of the public domain and no one can obtain a monopoly on such images by putting them into a fixed and tangible medium of expression.
   [NOTE: This entry is included fairly high up in the presentation order of search results because it succinctly describes both the merger doctrine and the scenes a faire doctrine, two separate doctrines that, although distinct from one another, are so interrelated as to require an understanding of the interplay between the two.]
4. Scènes à Faire
   http://www.photosecrets.com/scenes-a-faire
   "Scènes à faire . . . a principle in copyright law in which certain elements of a creative work are held to be not protected when they are mandated by or customary to the genre."
   [NOTE: Good overview in chart form of links to key cases applying the scenes a faire doctrine and significant opinion language from each case.]
5. Scènes à Faire
   http://itlaw.wikia.com/wiki/Scenes_%C3%A0_faire
   Scènes à faire refers to "incidents, characters or settings which are as a practical matter indispensable, or at least standard, in the treatment of a given topic."
   [NOTE: A good brief description with case authority regarding the scenes a faire doctrine as it applies to computer programs.]

Systems and methods for acquiring and providing expert search threads can take a variety of forms. In one example, a portion of a system acquires expert threads from experts. That portion of the system enables a user to mark/identify all or a portion of their search results regarding one or more topics; organize those search results into various orders or search threads (e.g., macro to micro, deductive, inductive, chronological in terms of which site a user should look at first, second, third, etc., as a taxonomy or an ontology [or both]); and identify themselves as the expert or super user who compiled those search threads (e.g., the more other users use or follow an expert's thread, the higher the ranking/search result placement that expert receives in the search results displayed whenever the same or related search terms or keywords are used in a search query by another user, or whenever a similar or related subject matter or topic is suggested by the search terms or keywords used in a search query by another user).

Another portion of a system provides search results to users. In one example, a computer system is configured to receive a search query containing one or more search terms or keywords; responsive to the search query, provide search results related to such search query including providing one or more expert search threads for a user to traverse.

In one example, the search results providing portion of a system can be configured to aid an expert in designing an expert search thread. The system can be configured to allow an expert to create a search thread combining a set of search results together by marking or otherwise identifying select search results and organizing such search results in an order designated by the expert (e.g., in order of importance, such that the first result is the first item a user new to the subject matter or topic should read/view first, the second result is the second item of importance or the second item a new user should read/view, etc.; or as an ontological taxonomy, where each link is placed in one or more hierarchies created by the expert [such as "intellectual property>copyright law>infringement>affirmative defenses>scenes a faire doctrine," and "visual arts>photography>protecting works>copyright>merger doctrine"], and relationships across taxonomies are also shown [for example, connecting the scenes a faire doctrine and the merger doctrine showing that the two are closely related). The system can further be configured to allow the expert to notate, highlight, crop or create clips of search results (e.g., of search results containing image, audio or video files) within a search thread, and to provide comments, suggestions, guidelines, and the like for navigating the search thread or any search result within a thread. In one example, a system is further configured to enable the expert to underline, highlight, bold, italicize, bracket, mark or otherwise distinguish or set apart webpage text or other portions of search results (e.g., images, audio or video clips, or cropped or clipped portions thereof, including run times, start and end times or positions along an audio or video scrollbar, or the like) [similar to Evernote Web Clipper].

A system may be configured to generate expert search threads that contain a series of links that a user is recommended to follow. In other examples, a system is further configured to enable the expert to export some or all of the expert's search thread content (e.g., hyperlinks, webpage text, images, audio or video clips, etc.), in whole or in part (e.g., clipped or cropped), to a single document or other repository, which users can access by clicking on the expert's search thread, and which lists or otherwise organizes the expert's search thread content in an order or format selected by the expert. For example, upon clicking on an expert's search thread (i.e., one of the results returned in response to a search performed by a user), the user might see a list of 25 links, listed in the order they should be viewed, which links include entire articles with select text highlighted by the expert, clipped text (without the surrounding text in the original webpage or article from which the text was clipped), cropped image, audio and video files (showing only those portions that the expert deems relevant), clipped audio and video files (showing the relevant start and end run times within those files), etc.

Upon viewing and/or utilizing an expert search thread, a user may be provided an opportunity to rate each search thread according to various criteria (e.g., the more other users use or follow an expert's thread, the higher the ranking/search result placement that expert's search thread receives in the search results displayed whenever the same or related search terms or keywords are used in a search query by another user, or whenever a similar or related subject matter or topic is suggested by the search terms or keywords used in a search query by another user, or according to the ranking of expert threads as determined by users in the aggregate. Ratings from multiple users may be compiled into a composite score for an expert search thread.

In one example, certain user's ratings are weighted disproportionately to others (e.g., expert users' ratings (i.e., peer reviews) are weighted higher than regular user ratings). Weighting of select users' rating of expert threads can be based on a variety of criteria, including a user's: (a) own background (e.g., personal or professional information that suggests an expertise or deeper understanding of the same or similar topic(s) or subject matter being searched, such as an attorney who practices intellectual property law); (b) familiarity with the topic or subject matter being searched (e.g., as extrapolated from the user's site profile or other publicly available information); or (c) ratings (either system generated or those generated by other users) received in connection with the same or other searches (analogous to a seller's reputation or feedback score/rating on eBay).

Each expert's search thread is then displayed in accordance with its respective rank based on the ratings. Whenever other users input search terms or keywords related to a subject matter or topic in a search query similar to the subject matter or topic of the search conducted by the expert in creating their search thread. While in some embodiments, expert search threads can receive higher placement in results, highlighting, or other means of distinguishing relative to other search results (i.e., relative to other experts' search threads, organic/natural search results, paid search results, or other search results), based on payment of a premium price or other consideration. However, in other systems, such payments may not be permitted to avoid any tainting of the meritocracy of the system.

Figure 6A:
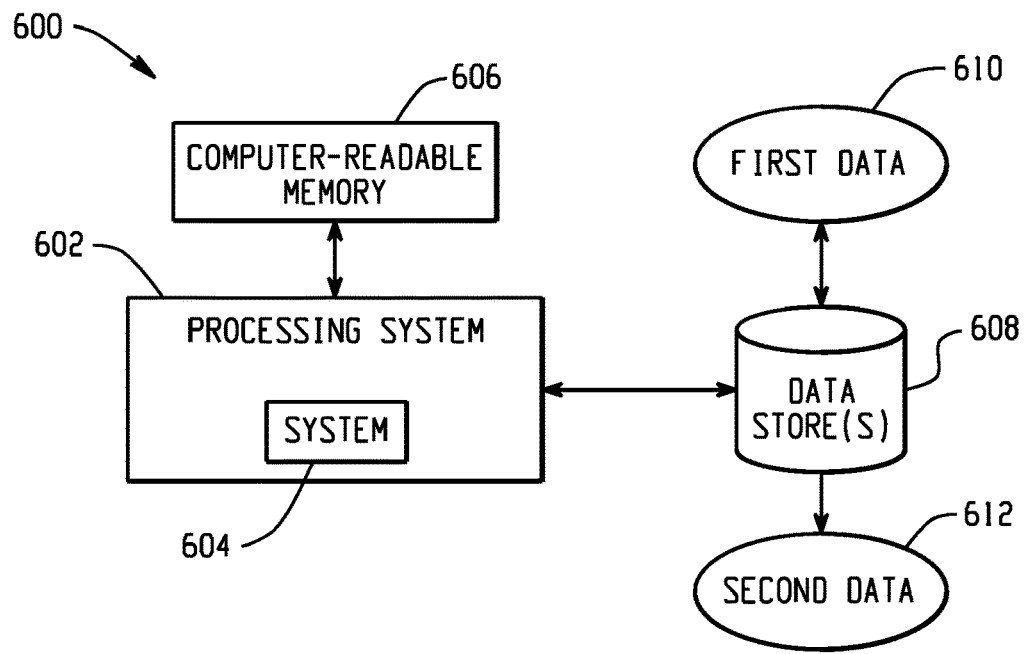
FIGS. 6A, 6B, and 6C depict example systems for use in implementing a system for providing expert search results.
Figure 6B:
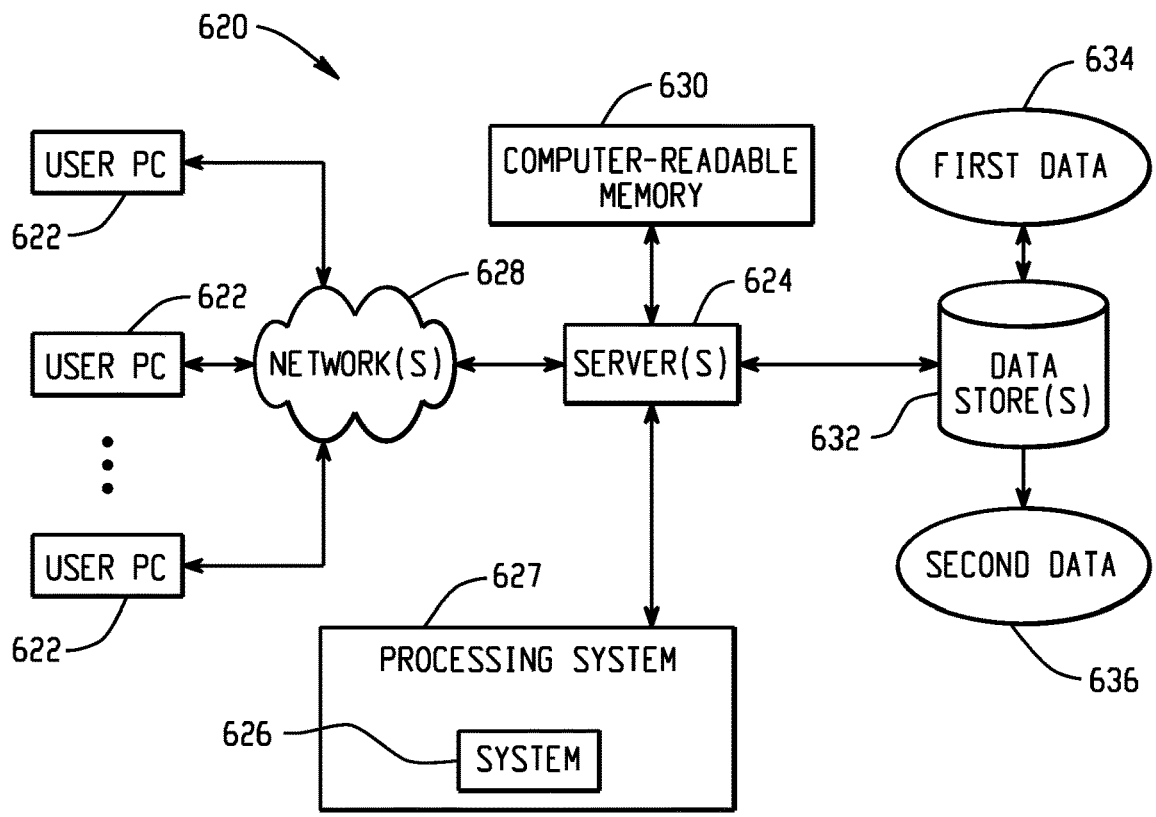
Figure 6C:
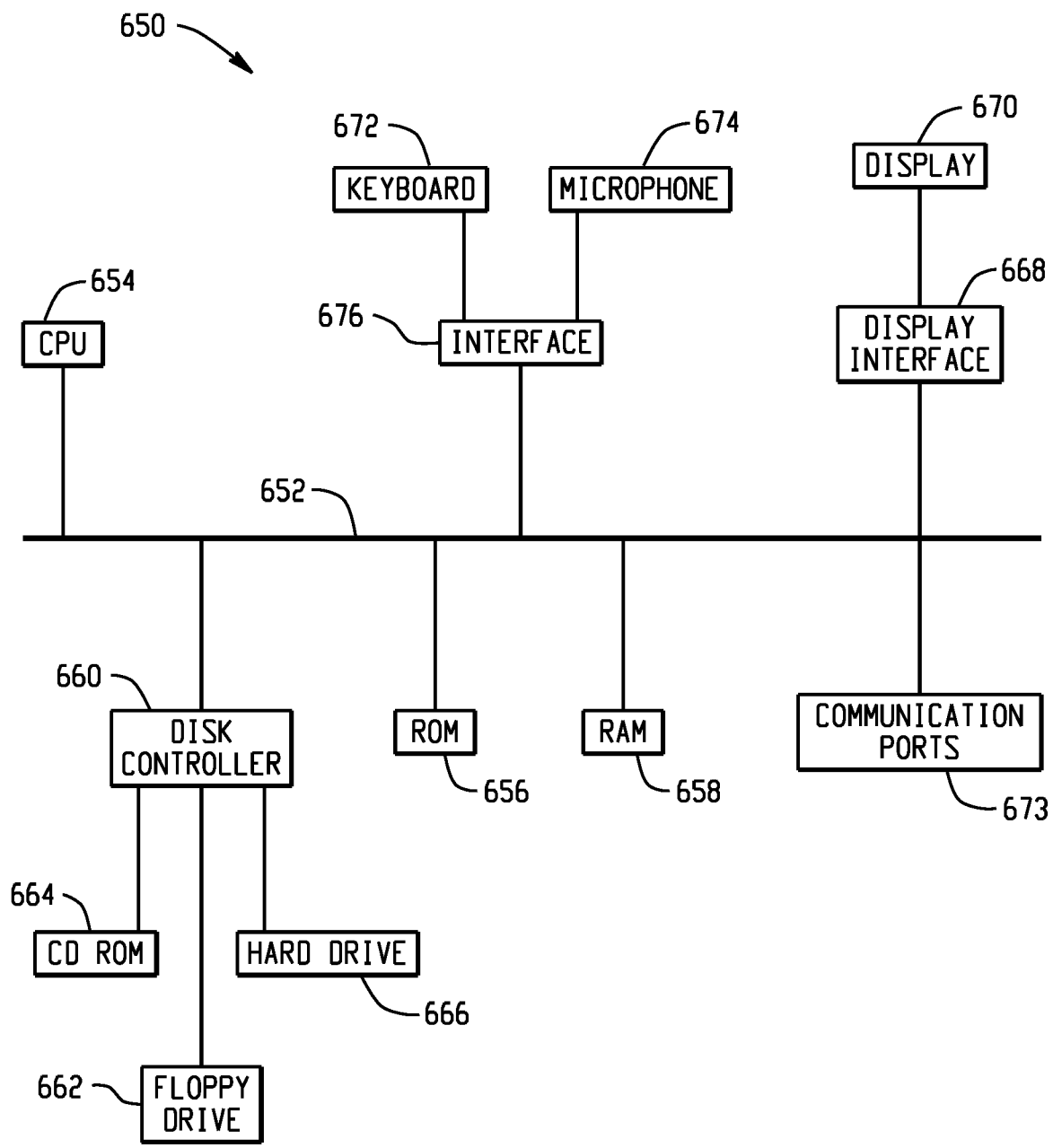

FIGS. 6A, 6B, and 6C depict example systems for use in implementing a system for providing expert search results. For example, FIG. 6A depicts an exemplary system 600 that includes a standalone computer architecture where a processing system 602 (e.g., one or more computer processors) includes a system 604 being executed on it. The processing system 602 has access to a computer-readable memory 606 in addition to one or more data stores 608. The one or more data stores 608 may contain first data 610 as well as second 612.

FIG. 6B depicts a system 620 that includes a client server architecture. One or more user PCs 622 accesses one or more servers 624 running a system 626 on a processing system 627 via one or more networks 628. The one or more servers 624 may access a computer readable memory 630 as well as one or more data stores 632. The one or more data stores 632 may contain first data 634 as well as second data 636.

FIG. 6C shows a block diagram of exemplary hardware for a standalone computer architecture 650, such as the architecture depicted in FIG. 6A, that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors) may perform calculations and logic operations required to execute a program. A processor-readable storage medium, such as read only memory (ROM) 656 and random access memory (RAM) 658, may be in communication with the processing system 654 and may contain one or more programming instructions. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 656 to be displayed on a display 670 in audio, graphic, or alphanumeric format. Communication with external devices may optionally occur using various communication ports 672.

In addition to the standard computer-type components, the hardware may also include data input devices, such as a keyboard 672, or other input device 674, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method for providing search results, comprising:
    aggregating social media posts across one or more social platforms and storing the social media posts in a data store;
    analyzing the social media posts to identify a candidate for authoring an expert search thread, wherein one or more search terms and one or more characteristics are extracted from one or more social media posts of the candidate, the one or more characteristics being input into a regression model having weights that are based on correlations between post characteristics of the one or more social media posts of the candidate and post characteristics of a predetermined subset of past posts;
    contacting the candidate, who was identified based on analysis of the aggregated social media posts, to solicit the candidate to draft and submit an expert search thread, wherein the expert search thread solicited includes an identification of a plurality of links entered via a user interface by the expert that the expert identifies as being helpful to learning about a topic associated with the one or more search terms;
    receiving the expert search thread from the candidate over a network and storing the expert search thread in a database for access as a web page via a query from a third party that includes one or more of the search terms and the one or more characteristics that were extracted from the one or more social media posts of the candidate, wherein the expert search thread received from the candidate includes the plurality of links;
    receiving a search query from a third party, the search query including one or more of the search terms; and
    providing the expert search thread in a set of search results prompted by the one or more of the search terms included with the received search query.

2. The method of claim 1, further comprising:
    determining a quality metric associated with the one or more characteristics of the one or more social media posts of the candidate;
    wherein the candidate is identified based on the quality metric.

3. The method of claim 2, wherein the quality metric is based on a topic associated with the one or more social media posts of the candidate.

4. The method of claim 3, wherein the one or more social media posts are pre-identified for use as inputs to the regression model when the one or more social media posts are associated with a trending topic.

5. The method of claim 3, wherein the one or more social media posts are pre-identified for use as inputs to the regression model when the one or more social media posts are associated with a trending topic and the one or more social media posts were made well before the trending topic began trending.

6. The method of claim 3, further comprising:
    identifying publications of the candidate that are associated with the topic, wherein the quality metric is increased when the candidate has published one or more publications associated with the topic.

7. The method of claim 6, wherein the publications are identified by reviewing one or more web pages associated with the candidate.

8. The method of claim 7, wherein the one or more web pages include a social media profile page.

9. The method of claim 2, wherein the quality metric is based on a comparison of words used in the one or more social media posts and words used within a past particular period of time in articles across a plurality of circulated publications.

10. The method of claim 9, wherein the circulated publications include newspaper articles, magazines, online articles, and blogs, and wherein the past particular period of time is one week.

11. The method of claim 9, wherein a set of words are filtered from the comparison.

12. The method of claim 11, wherein the filter removes articles and conjunctions, wherein the filter further removes or limits the search to a search key word, wherein the search key word filter supports wildcard and stem operators.

13. The method of claim 2, wherein the quality metric is based on a length of the one or more social media posts of the candidate.

14. The method of claim 2, wherein the quality metric is based on a number of factual statements identified in the one or more social media posts of the candidate.

15. The method of claim 14, wherein a statement is identified as a factual statement based on a part-of-speech pattern associated with the statement.

16. The method of claim 2, wherein the quality metric is based on a number of interactions of others with the one or more social media posts of the candidate.

17. The method of claim 16, wherein the interactions include likes, shares, and replies.

18. The method of claim 1, wherein the candidate is contacted via a private message using a social media platform associated with the one or more social media posts or the candidate is contacted using a reply to one of the one or more social media posts.

19. The method of claim 1, wherein the expert search thread further includes an order associated with the plurality of links that the expert identifies as being optimal for viewing the plurality of links to learn about the topic.

20. The method of claim 1, wherein the link to the expert search thread is positioned in the set of results according to a credibility score determined based on ratings of the expert search thread by a plurality of users.

21. The method of claim 1, wherein the expert search thread solicited includes an identifier attributing the expert search thread to the candidate.

22. The method of claim 21, wherein the identifier includes a link to a social media account of the candidate, a name of the contributor, contact information for the contributor, a biography of the contributor, a link to a webpage of the contributor, or a link to a webpage of a business associated with the contributor.

23. The method of claim 1, wherein the expert search thread is provided as an ordered list of links to the suggested documents;
wherein the expert search thread further includes annotations from the candidate who created of the expert thread.

24. The method of claim 1, further comprising:
providing an interface for the candidate to enter details of the expert search thread solicited;
wherein the interface for the candidate to enter details of the expert search thread solicited;
wherein the interface is configured to receive an identification of the links and identification of one or more additional search terms to associate with the expert search thread solicited.

25. The method of claim 24, further comprising:
analyzing the one or more additional search terms to confirm that the one or more additional search terms are on topic, wherein off topic additional search terms are not associated with the expert search thread.

26. The method of claim 25, wherein analyzing the one or more additional search terms comprises:
extracting words used in destination pages of the links of the expert search thread solicited; and
comparing the extracted words from the destination pages to the additional search terms to determine whether the additional search terms are off topic.

27. The method of claim 26, wherein comparing the extracted words to the additional search term includes calculating a distance between one of the additional search terms and the extracted words, wherein the additional search term is deemed off topic when the distance is greater than a threshold.

28. The method of claim 27, wherein calculating the distance comprises:
identifying a first cluster in a word hierarchy to which a particular additional search term belongs;
identifying a second cluster in the word hierarchy to which a particular extracted word belongs;
calculating the distance based on how far apart the first cluster and the second cluster are in the hierarchy.

29. A computer-implemented system for providing search results, comprising:
a processing system comprising one or more data processors;
a computer-readable medium encoded with instructions for commanding the processing system to execute steps comprising:
aggregating social media posts across one or more social platforms and storing the social media posts in a data store;
analyzing the social media posts to identify a candidate for authorizing an expert search thread, wherein one or more search terms and one or more characteristics are extracted from one or more social media posts of the candidate, the one or more characteristics being input into a regression model having weights that are based on correlations between post characteristics of the one or more social media posts of the candidate and post characteristics of a predetermined subset of past posts;
contacting the candidate, who was identified based on analysis of the aggregated social media posts, to solicit the candidate to draft and submit an expert search thread, wherein the expert search thread solicited includes an identification of a plurality of links entered via a user interface by the expert that the expert identifies as being helpful to learning about a topic associated with the one or more search terms;
receiving the expert search thread from the candidate over a network and storing the expert search thread in a database for access as a web page via a query from a third party that includes one or more of the search terms and the one or more characteristics that were extracted from the one or more social media posts of the candidate, wherein the expert search thread received from the candidate includes the plurality of links;
receiving a search query from a third party, the search query including one or more of the search terms; and
providing the expert search thread in a set of search results prompted by the one or more of the search terms included with the received search query.

30. A non-transitory computer-readable medium encoded with instructions for commanding a processing system to execute steps for providing search results comprising:
  aggregating social media posts across one or more social platforms and storing the social media posts in a data store;
  analyzing the social media posts to identify a candidate for authoring an expert search thread, wherein one or more search terms and one or more characteristics are extracted from one or more social media posts of the candidate, the one or more characteristics being input into a regression model having weights that are based on correlations between post characteristics of the one or more social media posts of the candidate and post characteristics of a predetermined subset of past posts;
  contacting the candidate, who was identified based on analysis of the aggregated social media posts, to solicit the candidate to draft and submit an expert search thread, wherein the expert search thread solicited includes an identification of a plurality of links entered via a user interface by the expert that the expert identifies as being helpful to learning about a topic associated with the one or more search terms;
  receiving the expert search thread from the candidate over a network and storing the expert search thread in a database for access as a web page via a query from a third party that includes one or more of the search terms and the one or more characteristics that were extracted from the one or more social media posts of the candidate, wherein the expert search thread received from the candidate includes the plurality of links;
  receiving a search query from a third party, the search query including one or more of the search terms; and
  providing the expert search thread in a set of search results prompted by the one or more of the search terms included with the received search query.

31. The method of claim 1, wherein the social media posts are posts made on a social media platform, a social networking platform, or a blog.

32. The method of claim 1, wherein the predetermined subset of past posts are past posts that are identified as being high quality posts.

33. The method of claim 1, wherein the predetermined subset of past posts is dynamically generated before said analyzing after performing initial or supplemental aggregating of social media posts.

34. The method of claim 1, wherein the predetermined subset of past posts is determined based on views, likes, replies, thumbs up, or upvotes of aggregated social media posts.

* * * * *